United States Patent [19]
Eilingsfeld et al.

[11] Patent Number: 4,897,469
[45] Date of Patent: Jan. 30, 1990

[54] ANILINE SERIES AZO REACTIVE DYES ORTHO- OR PARA-SUBSTITUTED BY VINYL SULFONYL REACTIVE GROUPS

[75] Inventors: Heinz Eilingsfeld, Frankenthal; Ruediger Iden, Speyer, both of Fed. Rep. of Germany

[73] Assignee: BASF Aktiengesellschaft, Ludwigshafen, Fed. Rep. of Germany

[21] Appl. No.: 177,480

[22] Filed: Apr. 1, 1988

[30] Foreign Application Priority Data

Apr. 7, 1987 [DE] Fed. Rep. of Germany ....... 3711763

[51] Int. Cl.$^4$ .................. C09B 62/026; C09B 62/507; D06P 1/38
[52] U.S. Cl. .................................... 534/605; 534/603; 534/606; 534/635; 534/636; 534/637; 534/638; 534/642
[58] Field of Search ............... 534/638, 642, 637, 603, 534/605, 606

[56] References Cited

U.S. PATENT DOCUMENTS 3,544,547 12/1970 Crabtree et al. ................. 534/638 X
4,271,072 6/1981 Wenghoefer et al. ............. 534/642
4,283,196 8/1981 Wenghoefer et al. ........... 634/642 X
4,585,460 4/1986 Schwander et al. ............. 534/642 X
4,754,024 6/1988 Schwander et al. ................ 534/642

FOREIGN PATENT DOCUMENTS 171611 2/1986 European Pat. Off. ............. 534/642
181585 5/1986 European Pat. Off. ............. 534/638
0197418 10/1986 European Pat. Off. ............. 534/638

Primary Examiner—Floyd D. Higel
Attorney, Agent, or Firm—Oblon, Spivak, McClelland, Maier & Neustadt

[57] ABSTRACT

Azo reactive dyes of the aniline series for dye or printing fiber materials of the formula

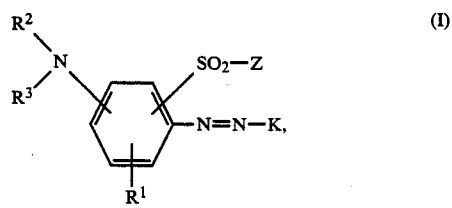

wherein K is the radical of a coupling component, and Z is a vinyl sulfonyl reactive group ortho- or para- to the azo bridge.

5 Claims, No Drawings

ANILINE SERIES AZO REACTIVE DYES ORTHO- OR PARA-SUBSTITUTED BY VINYL SULFONYL REACTIVE GROUPS

The present invention relates to novel azo reactive dyes whose diazo component comes from the aniline series and has, ortho or para to the azo bridge, a reactive group based on the vinylsulfonyl system, and to the use thereof for dyeing and printing fiber materials.

DE-A-3,512,340 discloses reactive dyes which are derived from azo dyes. In these reactive dyes, the azo components are aniline-based products which have a reactive group of the vinylsulfonyl system meta to the amino group.

We have now found novel azo reactive dyes of the formula I

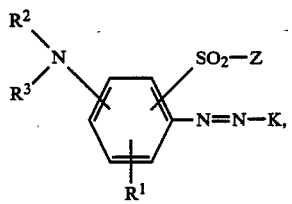

where
- K is the radical of a coupling component,
- $R^1$ is hydrogen, $C_1$-$C_4$-alkyl, $C_1$-$C_4$-alkoxy, halogen, carboxyl, $C_1$-$C_4$-alkoxycarbonyl, carbamoyl, $C_1$-$C_4$-mono- or dialkyl carbamoyl or hydroxysulfonyl,
- Z is vinyl or the radical $CH_2$—$CH_2$—$Z^1$ where $Z^1$ is $OSO_3H$, $SSO_3H$, $OPO(OH)_2$, formyloxy, acetyloxy or the radical

where the ring A may be substituted by carboxyl or carbamoyl and $An^\ominus$ is an anion,
- $R^2$ is hydrogen or $C_1$-$C_4$-alkyl which may be substituted by phenyl, and
- $R^3$ is unsubstituted or carboxyl-substituted $C_2$-$C_3$-alkenylcarbonyl, halogen-, $C_1$-$C_4$-alkylsulfonyl-or phenylsulfonyl-substituted $C_2$-$C_3$-alkenylcarbonyl, halogen-, $C_1$-$C_4$-alkylsulfonyl- or phenylsulfonyl-substituted propionyl, the radical CO—$CH_2$—$CH_2$—$Z^1$, where $Z^1$ has the abovementioned meaning, or a reactive group from the series of the aromatic nitrogen heterocyclics which have one or more reactive substituents, with the proviso that the radical $SO_2$-Z is not in the meta-position relative to the azo bridge.

The coupling components KH underlying the novel azo reactive dyes are known per se and have been described in large numbers, for example in Venkataraman, The Chemistry of Synthetic Dyes, vol. 6, pages 213 to 297, Academic Press, New York, London, 1972.

Important coupling components are those of the hydroxybenzene, hydroxynaphthalene, aniline, aminonaphthalene or aminohydroxynaphthalene series. Also possible are heterocyclics from the pyrazole, pyridine, pyrimidine, indole or barbituric acid series or else coupling components from the aceto arylide series.

Preferably these coupling components have sulfonic and/or carboxylic acid groups. If the coupling components likewise have fiber-reactive groups, they comprise in particular the radical

where $R^2$ and $R^3$ each have the abovementioned meanings.

The coupling components of the aniline or naphthaline series are for example N-monosubstituted anilines, m-phenylenediamine derivatives, naphtholsulfonic acids, aminonaphthalenes, naphthols, hydroxynaphthoic acid derivatives, aminonaphthalenesulfonic acids and aminonaphtholsulfonic acids.

Fiber-reactive group free coupling components KH of the aniline or naphthalene series correspond for example to compounds of the formulae Va–Ve

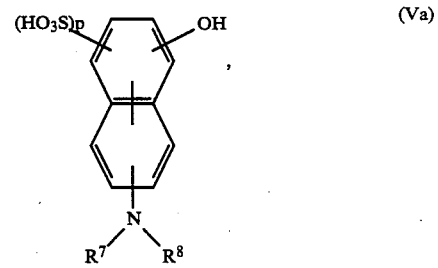

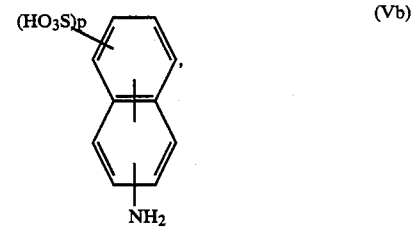

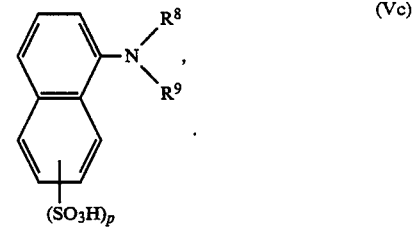

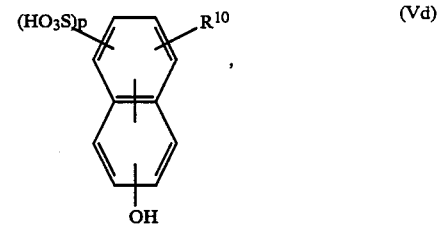

-continued

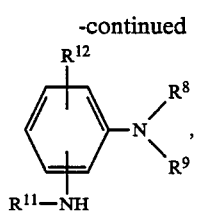
(Ve)

where
- $R^7$ is hydrogen, $C_1$–$C_4$-alkyl, benzoyl, $C_1$–$C_5$-alkanoyl or phenyl which can be substituted by hydroxysulfonyl,
- $R^8$ is hydrogen or $C_1$–$C_4$-alkyl which can be substituted by hydroxyl, carboxyl or hydroxysulfonyl,
- $R^9$ is hydrogen, $C_1$–$C_4$-alkyl which can be substituted by hydroxyl, carboxyl, hydroxysulfonyl or hydroxysulfonyloxy, benzyl or phenyl which can be substituted by $C_1$–$C_4$-alkyl, $C_1$–$C_4$-alkoxy, chlorine or hydroxysulfonyl,
- $R^{10}$ is hydrogen, $C_1$–$C_6$-alkylureido, phenylureido which can be substituted by chlorine, methyl, methoxy, nitro, hydroxysulfonyl or carboxyl, or hydroxyl,
- $R^{11}$ is hydrogen, carbamoyl, N-phenylcarbamoyl, $C_1$–$C_6$-alkyl, in particular $C_1$–$C_4$-alkyl, which can be substituted by phenyl, $C_1$–$C_4$-alkoxy, hydroxyl, phenoxy or $C_1$–$C_4$-alkanoyloxy, $C_5$–$C_7$-cycloalkyl or phenyl which can be substituted by hydroxysulfonyl,
- $R^{12}$ is hydrogen, methyl, ethyl, methoxy, ethoxy, carbamoyl, chlorine, bromine, acetyl, amino, ureido, methylsulfonylamino, methylamino, ethylamino, dimethylamino or diethylamino, and
- p is an integral number from 0 to 2.

Further coupling components comprise in particular: 1-amino-8-hydroxynaphthalene-3,6- or -4,6-disulfonic acid and the arylazo acid coupling products thereof of the formula VI

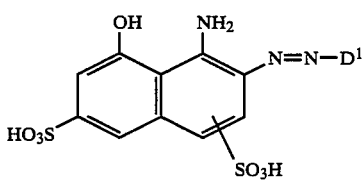
(VI)

where
$D^1$ is the radical of a diazo component of the formula

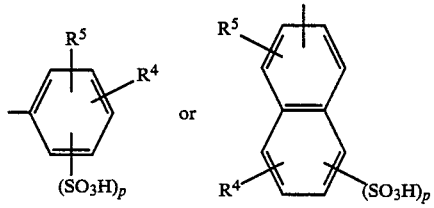

where
- $R^4$ is hydrogen, methoxy, acetyl, hydroxysulfonyl, carboxyl, carbamoyl, hydroxyl, fluorine, chlorine, bromine or trifluoromethyl,
- $R^5$ is hydrogen, methyl, methoxy, ethoxy, carboxyl, $C_1$–$C_5$-alkanoyl, fluorine, chlorine, nitro, aminosulfonyl, phenylsulfonyl or phenoxy and
- has the abovementioned meaning.

Coupling components of the heterocyclic series are for example pyrazolones, aminopyrazoles, 2,6-diaminopyridines, pyridones, hydroxypyrimidines, aminopyrimidines, indoles and barbituric acid derivatives.

Fiber-reactive group free coupling components in KHs of the heterocyclic series conform for example to the formulae VIIa–VIIc

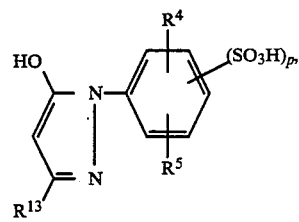
(VIIa)

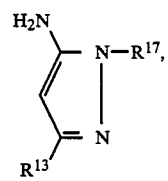
(VIIb)

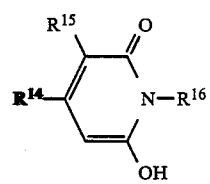
(VIIc)

where
- $R^{13}$ is methyl, methoxycarbonyl or phenyl,
- $R^{14}$ is methyl, phenyl, benzoyl, carboxyl or carbamoyl,
- $R^{15}$ is hydrogen, chlorine or acetylamino, amino, hydroxysulfonyl, carboxyl, acetyl, benzoyl or carbamoyl,
- $R^{16}$ is hydrogen, $C_1$–$C_4$-alkyl or carboxyl-, hydroxysulfonyl-, methyl-, methoxy- or chlorine-substituted phenyl and
- $R^{17}$ is $C_1$–$C_4$-alkyl, cyclohexyl, benzyl or fluorine-, chlorine-, methyl-, methoxy-, nitro-, hydroxysulfonyl-, carboxyl-, methylsulfonyl- or carbamoyl-substituted phenyl and
- $R^4$, $R^5$ and p each have the abovementioned meanings.

Fiber-reactive group containing coupling components KH of the aniline or naphthalene series are for example compounds of the formula VIIIa or VIIIb

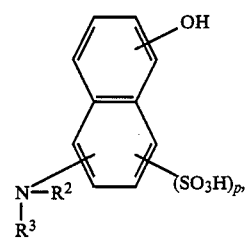
(VIIIa)

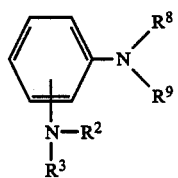

where $R^2$, $R^3$, $R^8$, $R^9$ and p each have the abovementioned meanings.

Also noteworthy are in particular the acid coupling arylazo coupling products of 1-amino-8-hydroxynaphthalene-3,6-or -4,6-disulfonic acid of the formula IX

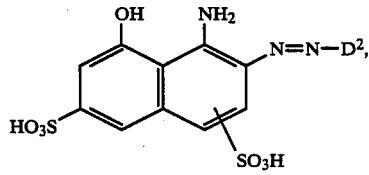

where $D^2$ is a reactive group-containing radical of a diazo component of the formula

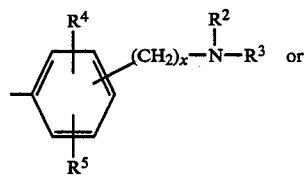

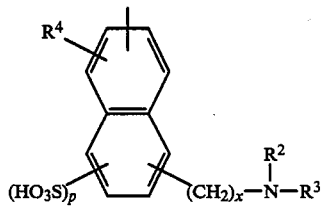

where x is an integral number from 0 to 2 and $R^2$, $R^3$, $R^4$, $R^5$ and p each have the abovementioned meanings.

All the alkyl groups appearing in the abovementioned radicals can be not only straight-chain but also branched.

$R^1$, $R^2$, $R^7$, $R^8$, $R^9$, $R^{11}$ and $R^{16}$ are for example methyl, ethyl, propyl, isopropyl, butyl, isobutyl, sec-butyl or tert-butyl.

$R^{11}$ is further for example pentyl, isopentyl, sec-pentyl, tert-pentyl or hexyl.

$R^8$ and $R^9$ are further for example 2-hydroxyethyl, 2-carboxyethyl, 2-hydroxysulfonylethyl, 2- or 3-hydroxypropyl, 2- or 3-carboxypropyl or 2- or 3-hydroxysulfonylpropyl.

$R^9$ is further for example 2-sulfatoethyl or 2- or 3-sulfatopropyl.

$R^2$ and $R^{11}$ are further for example benzyl or 2-phenylethyl.

$R^{11}$ is further for example 2-hydroxyethyl, 2-or 3-hydroxypropyl, 4-hydroxybutyl, 2-methoxyethyl, 2- ethoxyethyl, 2- or 3-methoxypropyl, 2- or 3-ethoxypropyl, 2-phenoxyethyl, 2- or 3-phenoxypropyl, 2-formyloxyethyl, 2-acetyloxyethyl, 3-acetyloxypropyl, 4-acetyloxybutyl, cyclopentyl, cyclohexyl or cycloheptyl.

$R^1$ is further for example methoxy, ethoxy, propoxy, isopropoxy, butoxy, isobutoxy, sec-butoxy, methoxycarbonyl, ethoxycarbonyl, propoxycarbonyl, isopropoxycarbonyl, butoxycarbonyl, methylcarbamoyl, ethylcarbamoyl, propylcarbomoyl, isopropylcarbomoyl, butylcarbamoyl, dimethylcarbamoyl, diethylcarbamoyl, diisopropylcarbomoyl or methyl-ethylcarbamoyl.

Z is for example vinyl, 2-hydroxysulfonylethyl, 2-sulfatoethyl, 2-thiosulfatoethyl, 2-phosphatoethyl, 2-formyloxyethyl or 2-acetyloxyethyl.

If $Z^1$ is the radical

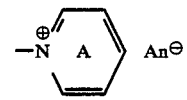

$An^\ominus$ is an anion, for example chloride, bromide, sulfate or phosphate. If this ring A is substituted by carboxyl no external anion $An^\ominus$ is required, since a betaine structure is formed.

Z is further for example 2-pyridiniumethyl (as chloride), 2-(3-carboxypyridinium)ethyl or 2-(3-carbamoylpyridinium)ethyl (as chloride).

$R^9$ is further for example 4-methylbenzyl, 2-chlorobenzyl, 2-methoxybenzyl, 4-hydroxysulfonylbenzyl, 2-methylphenyl, 2-ethylphenyl, 2,4-dimethylphenyl, 2- or 3-chlorophenyl, 4-ethoxyphenyl or 3-hydroxysulfonylphenyl.

$R^{10}$ is for example methylureido, ethylureido, propylureido, isopropylureido, butylureido, isobutylureido, pentylureido, hexylureido, phenylureido, 2-chlorophenylureido, 4-methylphenylureido or 3-hydroxysulfonylureido.

$R^5 R^7$ are further for example formyl, acetyl, propionyl, butyryl, isobutyryl or pentanoyl.

$R^{16}$ and $R^{17}$ are further for example 2- or 3-carboxyphenyl, 4-hydroxysulfonylphenyl, 2-methylphenyl, 2,4-dimethylphenyl, 4-methoxyphenyl, 2-chlorophenyl or 2,4-dichlorophenyl.

$R^{17}$ is further for example 2- or 4-fluorophenyl, 3-nitrophenyl, 4-methylsulfonylphenyl or 4-carbamoylphenyl.

Suitable reactive groups $R^3$, i.e. groups which react with the hydroxyl or imino groups of the fiber under dyeing conditions to form covalent bonds, are those which contain at least one reactive substituent on a 5- or 6-membered aromatic nitrogen heterocyclic. Such nitrogen heterocyclics which, besides nitrogen, can also contain other hetero atoms, for example oxygen or sulfur, in the ring, are for example azines, diazines or triazines, such as pyridines, pyrimidines, pyridazines, pyrazines, thiazines, oxazines or asymmetrical or symmetrical triazines, or else ring systems which have one or more fusedon aromatic carbocyclics, such as quinolines, phthalazines, quinazolines, quinoxalines, acridines, phenazines or phenanthridines.

Reactive substituents on the heterocyclic are for example halogen, in particular fluorine, chlorine or bromine, ammonium, hydrazinium, unsubstituted or carboxyl or carbamoyl-substituted pyridinium, sulfonium, sulfonyl, azido, thiocyanato, thio, sulfino or sulfono.

Specific examples are: 2,4-dichlorotriazin-6-yl, 2,4-difluorotriazin-6-yl, monohalo-sym-triazinyl radicals, in particular monochlorotriazinyl or monofluorotriazinyl radicals which are substituted by $C_1$-$C_4$-alkyl, phenyl, naphthyl, amino, $C_1$-$C_4$-monoalkylamino or dialkylamino, phenylamino, naphthylamino, $C_1$-$C_4$-alkoxy, phenoxy, naphthyloxy, $C_1$-$C_4$-alkylthio, phenylthio or naphthylthio, while the $C_1$-$C_4$-alkyl, phenyl or naphthyl groups which appear in these radicals may be substituted. Suitable substituents for $C_1$-$C_4$-alkyl are for example hydroxyl, cyano, $C_1$-$C_4$-alkoxy, phenyl, carboxyl, hydroxysulfonyl or sulfato, while suitable substituents for phenyl or naphthyl are hydroxysulfonyl, $C_1$-$C_4$-alkyl, $C_1$-$C_4$-alkoxy, carboxyl, fluorine, chlorine, bromine or $C_1$-$C_4$-acylamino.

Examples are the following radicals: 2-amino-4-fluorotriazin-6-yl, 2-methylamino-4-fluorotriazin-6-yl, 2-ethylamino-4-fluorotriazin-6-yl, 2-isopropylamino-4-fluorotriazin-6-yl, 2-dimethylamino-4-fluorotriazin-6-yl, 2-diethylamino-4-fluorotriazin-6-yl, 2-(2-methoxyethylamino)-4-fluorotriazin-6-yl, 2-(2-hydroxyethylamino)-4-fluorotriazin-6-yl, 2-[bis(2-hydroxyethyl)amino]-4-fluorotriazin-6-yl, 2-[N-(2-hydroxysulfonyl)-N-methylamino]-4-fluorotriazin-6-yl, 2-carboxymethylamino-4-fluorotriazin-6-yl, 2-(2-hydroxysulfonylethylamino)-4-fluorotriazin-6-yl, 2-(2-cyanoethylamino)-4-fluorotriazin-6-yl, 2-benzoylamino-4-fluorotriazin-6-yl, 2-(2-phenylethylamino)-4-fluorotriazin-6-yl, 2-(N-benzyl-N-methylamino)-4-fluorotriazin-6-yl, 2-(3-hydroxysulfonylbenzylamino)-4-fluorotriazin-6-yl, 2-cyclohexylamino-4-fluorotriazin-6-yl, 2-(o-, m- or p-methylphenylamino)-4-fluorotriazin-6-yl, 2-(o-, m- or p-hydroxysulfonylphenylamino)-4-fluorotriazin-6-yl, 2-(2,5-dihydroxy-sulfonylphenylamino)-4-fluorotriazin-6-yl, 2-(o-, m- or p-chlorophenylamino)-4-fluorotriazin-6-yl, 2-(o-, m- or p-methoxyphenyl)-4-fluorotriazin-6-yl, 2-(2-methyl-4-hydroxysulfonyl-phenylamino)-4-fluorotriazin-6-yl, 2-(2-methyl-5-hydroxysulfonylphenylamino)-3-fluorotriazin-6-yl, 2-(2-chloro-4-hydroxysulfonylphenylamino)-4-fluorotriazin-6-yl, 2-(2-chloro-5-hydroxysulfonylphenylamino)-4-fluorotriazin-6-yl, 2-(2-methoxy-4-hydroxysulfonylphenylamino)-4-fluorotriazin-6-yl, 2-(o-, m- or p-carboxyphenylamino)-4-fluorotriazin-6-yl, 2-(2,4-dihydroxysulfonylphenylamino)-4-fluorotriazin-6-yl, 2-(3,5-dihydroxysulfonylphenylamino)-4-fluorotriazin-6-yl, 2-(2-carboxy-4-hydroxysulfonylphenyl-amino)-4-fluorotriazin-6-yl, 2-(2-carboxy-4-hydroxysulfonylphenylamino)-4-fluorotriazin-6-yl, 2-(6-hydroxysulfonylnaphth-2-ylamino)-4-fluorotriazin-6-yl, 2-(4,8-dihydroxysulfonylnaphth-2ylamino)-4-fluorotriazin-6-yl, 2-(6,8-dihydroxysulfonylnaphth-2-yl-amino-4-fluorotriazin-6-yl, 2-(N-methyl-N-phenylamino)-4-fluorotriazin-6-yl, 2-(N-ethyl-N-phenylamino)-4-fluorotriazin-6-yl, 2-[N-hydroxyethyl)-N-phenylamino]-4-fluorotriazin-6-yl, 2-(N-isopropyl-N-phenylamino)-4-fluorotriazin-6-yl, 2-morpholino-4-fluorotriazin-6-yl, 2-piperidino-4-fluorotriazin-6-yl, 2-(4,6,8-trihydroxysulfonylnaphth-2-yl)-4-fluorotriazin-6-yl, 2-(3,6,8-trihydroxysulfonyl-naphth-2-yl)-4-fluorotriazin-6-yl, 2-(3,6-dihydroxysulfonylnaphth-1-yl)-4-fluorotriazin-6-yl, N-methyl-N-(2,4-dichlorotriazin-6-yl)-carbomoyl, N-methyl-N-(2-methylamino-4-chlorotriazin-6-yl)-carbamoyl, N-methyl-N-(2-dimethylamino-4-chlorotriazin-6-yl)-carbamoyl, N-methyl or N-ethyl-N-(2,4-dichlorotriazin-6yl)-aminoacetyl, 2-methoxy-4-fluorotriazin-6-yl, 2-ethoxy-4-fluorotriazin-6-yl, 2-phenoxy-4-fluorotriazin-6-yl, 2-(o-, m- or p-hydroxysulfonylphenoxy)-4-fluorotriazin-6-yl, 2-(o-, m- or p-methyl- or -methoxy-phenoxy)-4-fluorotriazin-6-yl, 2-(2-hydroxyethylmercapto)-4-fluorotriazin-6-yl, 2-phenylmercapto-5-fluorotriazin-6-yl, 2-(4-methylphenylmercapto)-4-fluorotriazin-6-yl, 2-(2,4-dinitrophenylmercapto)-4-fluorotriazin-6-yl, 2-methyl-4-fluorotriazin-6-yl, 2-phenyl-4-fluorotriazin-6-yl or the corresponding 4-chloro- or 4-bromo-radicals or the radicals obtainable by replacement of halogen atoms mentioned by tertiary bases, such as trimethylamine, triethylamine, 2-(N,N-dimethylamino)ethanol, triethanolamine, N,N-dimethylhydrazine, pyridine, α, β, or γ-picoline, nicotinic or isonicotinic acid, or sulfinates, in particular by benzenesulfinate.

Further there may be mentioned mono-, di- or trihalopyrimidinyl radicals, such as 2,4-dichloroyrimidin-6-yl, 2,3,5-trichloropyrimidin-6-yl, 2,4-dichloro-5-nitro-or -5-methyl or -5-carboxymethyl- or -5-carboxy- or -5-cyano- or -5-vinyl- or -5-hydroxysulfonyl- or -5-mono-, -di- or -trichloromethyl- or -5-carbethoxypyrimidin-6-yl, 2,6-dichloropyrimidin-4-ylcarbonyl, 2,4-dichloropyrimidin-5-ylcarbonyl, 2-chloro-4-methylpyrimidin-5-ylcarbonyl, 2-methyl-4-chloropyrimidin-5-ylcarbonyl, 2-methylthio-4-fluoropyrimidin-5-ylcarbonyl, 6-methyl-2,4-dichloropyrimidin-5-ylcarbonyl-, 2,4,6-trichloropyrimidin-5-ylcarbonyl, 2,4-dichloropyrimidin-5-ylsulfonyl, 2-chloroquinoxalin-3-ylcarbonyl, 2- or 3-chloroquinoxalin-6-ylcarbonyl, 2- or 3-chloroquinoxalin-6-ylsulfonyl, 2,3-dichloroquinoxalin-6-ylcarbonyl, 2,3-dichloroquinoxalin-6-ylsulfonyl, 1,4-dichlorophthalazin-6-ylsulfonyl or -6-ylcarbonyl, 2,4-dichloroquinazolin-6- or -7-ylsulfonyl or -ylcarbonyl, 2- or 3- or 4-(4,5-dichloro-pyridaz-6-on-1-yl)phenylsulfonyl or -carbonyl, 2-(4,5-dichloropyridaz-6-on-1-yl)-ethylcarbonyl or the corresponding monofluorine derivatives, N-methyl-N-(2,3-dichloroquinoxalin-6-ylsulfonyl)aminoacetyl, N-methyl-N-(2,3-dichloroquinoxalin-6-ylcarbonyl)aminoacetyl or the corresponding bromine or fluorine derivatives of the abovementioned chlorine-substituted heterocyclic radicals. Examples of which are 2-fluoropyrimidin-4-yl, 2,6-difluoropyrimidin-4-yl, 2,6-difluoro-5-chloropyrimidin-4-yl, 2-fluoro-5,6-dichloropyrimidin-4-yl, 2,6-difluoro-5-methylpyrimidin-4-yl, 2-fluoro-5-methyl-6-chloropyrimidin-4-yl, 2-fluoro-5-nitro-6-chloropyrimidin-4-yl, 5-bromo-2-fluoropyrimidin-4-yl, 2-fluoro-5-cyanopyrimidin-4-yl, 2-fluoro-5methylpyrimidin-4-yl, 2,5,6-trifluoropyrimidin-4-yl, 5-chloro-6-chloromethyl-2-fluoropyrimidin-4-yl, 2,6-difluoro-5-bromopyrimidin-4-yl, 2-fluoro-5-bromo-6-methylpyrimidin-4-yl, 2-fluoro-5-bromo-6-chloromethylpyrimidin-4-yl, 2,6-difluoro-5-chloromethylpyrimidin-4-yl, 2,6-difluoro-5-nitropyrimidin-4-yl, 2-fluoro-6-methylpyrimidin-4-yl, 2-fluoro-5-chloro-6-methylpyrimidin-4-yl, 2,6-difluoro-5-nitropyrimidin-4-yl, 2-fluoro-6-methylpyrimidin-4-yl, 2-fluoro-5-chloro-6-methylpyrimidin-4-yl, 2-fluoro-5-chloropyrimidin-4-yl, 2-fluoro-6-chloropyrimidin-4-yl, 6-trifluoromethyl-5-chloro-2-fluoropyrimidin-4-yl, 6-trifluoromethyl-2-fluoropyrimidin-4-yl, 2-fluoro-5-nitropyrimidin-4-yl, 2-fluoro-5-trifluoromethylpyrimidin-4-yl, 2-fluoro-5-phenylsulfonyl-or -5-methylsulfonylpyrimidin-4-yl, 2-fluoro-5-carbamoylpyrimidin-4-yl, 2-fluoro-5-carbmethoxypyrimidin-4-yl, 2-fluoro-5-bromo-6-trifluoromethylpyrimidin-4-yl, 2-fluoro-6-carbamoyl-pyrimidin-4-yl, 2-fluoro-6-carbmethoxypyrimidin-4-yl, 2-fluoro-6-phenylpyrimidin-4-yl, 2-fluoro-6-cyanopyrimidin-4-yl, 2-fluoro-4-dichloromethyl-5-chloropyrimidin-6-yl, 2-fluoro-5-chloropyrimidin-4-yl, 2-methyl-4-fluoro-5-methylsulfonylpyrimidin-6-yl, 2,6-difluoro-5-methylsulfonylpyrimidin-4-yl, 2-fluoro-5-sulfamoylpyrimidin-4-yl, 2-fluoro-5-chloro-6-carbmethoxypyrimidin-4-yl and 2,6-difluoro-5-trifluoromethylpyrimidin-4-yl.

Also possible are sulfonyl-containing triazine radicals, such as 2,4-bis(phenylsulfonyl)triazin-6-yl, 2-(3-carboxyphenylsulfonyl)-4-chlorotriazin-6-yl, 2-(3-hydroxysulfonylphenylsulfonyl)-4-chlorotriazin-6-yl or 2,4-bis(3-carboxy-phenylsulfonyl)triazin-6-yl, sulfonyl-containing pyrimidine rings, such as 2-carboxymethylsulfonylpyrimidin-4-yl, 2-methylsulfonyl-6-methylpyrimidin-4-yl, 2-methylsulfonyl-6-ethylpyrimidin-4-yl, 2-phenylsulfonyl-5-chloro-6-methylpyrimidin-4-yl, 2,6-bis(methylsulfonyl)pyrimidin-4-yl, 2,6-bis(methylsulfonyl)-5-chloropyrimidin-4-yl, 2,4-bis(methylsulfonyl)-pyrimidin-5-ylsulfonyl, 2-methylsulfonylpyrimidin-4-yl, 2-phenylsulfonyl-pyrimidin-4-yl, 2-trichloromethylsulfonyl-6-methylpyrimidin-4-yl, 2-methylsulfonyl-5-chloro-6-methylpyrimidin-4-yl, 2-methylsulfonyl-5-bromo-6-methylpyrimidin-4-yl, 2-methylsulfonyl-5-chloro-6-methyl-pyrimidin-4-yl, 2-methylsulfonyl-5-chloro-6-chloromethylpyrimidin-4-yl, 2-methylsulfonyl-4-chloro-6-methylpyrimidin-5-ylsulfonyl, 2-methylsulfonyl-5-nitro-6-methylpyrimidin-4-yl, 2,5,6-tris(methylsulfonyl)-pyrimidin-4-yl, 2-methylsulfonyl-5,6-dimethylpyrimidin-4-yl, 2-ethylsulfonyl-5-chloro-6-methyl-pyrimidin-4-yl, 2-methylsulfonyl-6-chloropyrimidin-4-yl, 2,6-bis(methylsulfonyl)-5-chloropyrimidin-4-yl, 2-methylsulfonyl-6-carboxypyrimidin-4-yl, 2-methylsulfonyl-5-hydroxysulfonylpyrimidin-4-yl, 2-methylsulfonyl-6-carbmethoxypyrimidin-4-yl, 2-methylsulfonyl-5-carboxypyrimidin-4-yl, 2-methylsulfonyl-5-cyano-6-methoxypyrimidin-4-yl, 2-methylsulfonyl-5-chloropyrimidin-4-yl, 2-(2-hydroxysulfonylethylsulfonyl)-6-methylpyrimidin-4-yl, 2-methylsulfonyl-5-bromopyridin-4-yl, 2-phenylsulfonyl-5-chloro-pyrimidin-4-yl, 2-carboxymethylsulfonyl-5-chloro-6-methylpyrimidin-4-yl, 2-methylsulfonyl-6-chloro-pyrimidin-4-or -5-ylcarbonyl, 2,6-bis(methylsulfonyl)pyrimidin-4-or -5-ylcarbonyl, 2-ethylsulfonyl-6-chloropyrimidin-5-ylcarbonyl, 2,4-bis(methylsulfonyl)pyrimidin-5-ylsulfonyl or 2-methylsulfonyl-4-chloro-6-methylpyrimidin-5-ylsulfonyl or -ylcarbonyl.

Also possible are 2-chlorobenzothiazol-5- or -6-ylcarbonyl or -5- or -6-ylsulfonyl, 2-methylsulfonyl- or 2-ethylsulfonylbenzothiazol-5- or -6-ylsulfonyl or -ylcarbonyl, 2-phenylsulfonylbenzothiazol-5- or -6-ylsulfonyl or -ylcarbonyl or the corresponding hydroxysulfonyl-containing (in the fused-on benzene ring) 2-sulfonylbenzothiazol-5-or -6-ylcarbonyl or -ylsulfonyl derivatives, 2-chlorobenzoxazol-5- or -6-ylcarbonyl or -ylsulfonyl, 2-chlorobenzimidazol-5-or -6-ylcarbonyl or -ylsulfonyl, 2-chloro-1-methylbenzimidazol-5- or -6-ylcarbonyl or -ylsulfonyl, 2-chloro-4-methylthiazol-5-ylcarbonyl or -ylsulfonyl or the N oxide of 4-chloro- or 4-nitro-quinolin-5-ylcarbonyl as examples.

Examples of radicals $R^3$ derived from unsubstituted or carboxyl-substituted $C_2$-$C_3$-alkenylcarbonyl, halogen-, in particular chlorine- or bromine-, $C_1$-$C_4$-alkylsulfonyl-or phenylsulfonyl-substituted $C_2$-$C_3$-alkenylcarbonyl, halogen-, in particular chlorine- or bromine-, $C_1$-$C_4$-alkylsulfonyl- or phenylsulfonyl-substituted propionyl or from the radical $CO-CH_2-CH_2-Z^1$ are acryloyl, mono-, di- or trichloroacryloyl, such as $-CO-CH=CH-Cl$ or $-CO-CCl=CH_2$, 3-bromoacryloyl, $-CO-CCl=CH-CH_3$, $-CO-CCl=CH-COOH$, $-CO-CH=CCl-COOH$, 3-methylsulfonylacryloyl, 3-phenylsulfonylacryloyl, 3-chloropropionyl, 3-phenylsulfonylpropionyl or 3-methylsulfonylpropionyl.

Preference is given to reactive dyes of the formulae II, III and IV

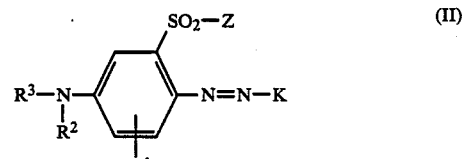

(II)

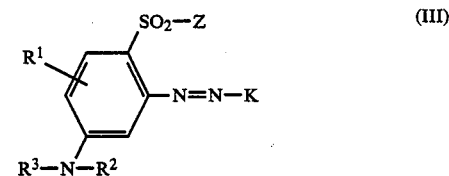

(III)

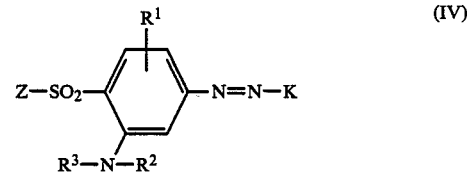

(IV)

where K, $R^1$, $R^2$, $R^3$ and Z each have the abovementioned meanings.

Particular preference is given to azo reactive dyes of the formula I where $R^2$ is hydrogen or $C_1$-$C_4$-alkyl and $R^3$ is monofluorotriazinyl, monochloro-triazinyl or dichlorotriazinyl, which are each substituted by phenyl, naphthyl, amino, $C_1$-$C_4$-monoalkylamino or -dialkylamino, phenylamino or naphthylamino, in which the phenyl, naphthyl and $C_1$-$C_4$-alkyl groups can each be substituted, difluoropyrimidinyl, trifluoropyrimidinyl, trichloropyrimidinyl, acryloyl or 3-sulfatopropionyl.

Preference is given in particular to reactive dyes of the formula II, III and IV where $R^2$ and $R^3$ each have the lastmentioned meanings.

Preferred azo reactive dyes have for example the following structural elements on the diazo side:

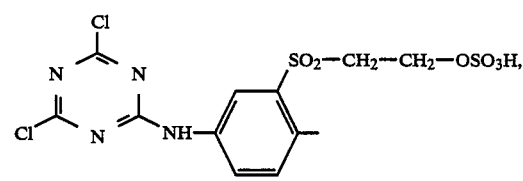

-continued
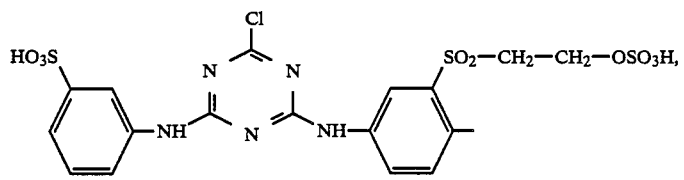
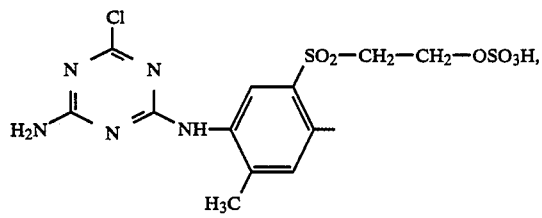
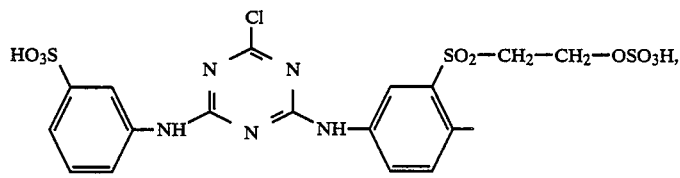
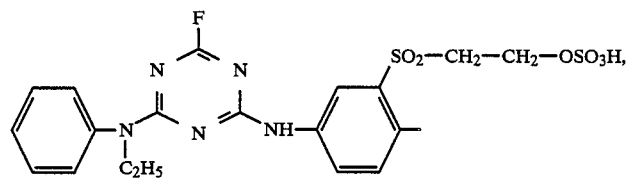
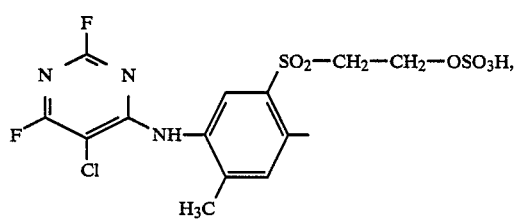
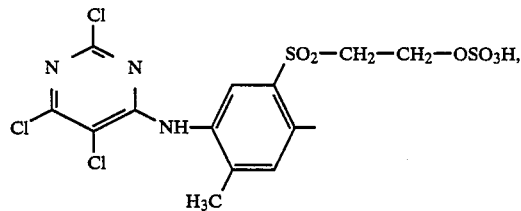
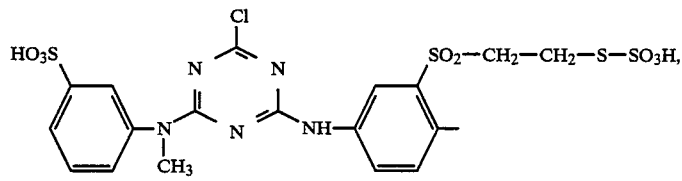
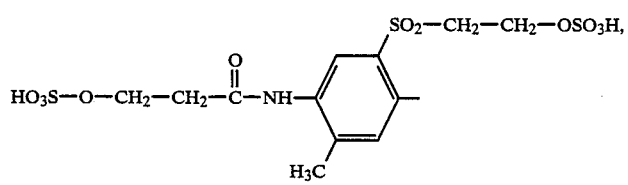

-continued
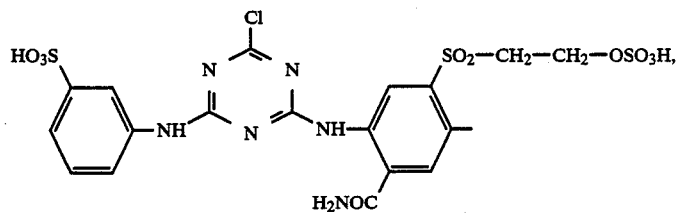
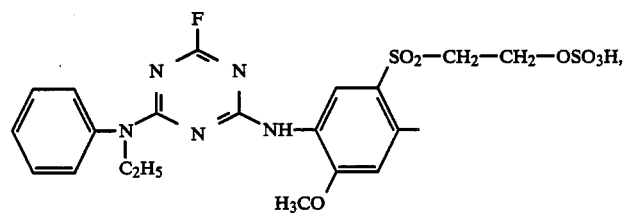
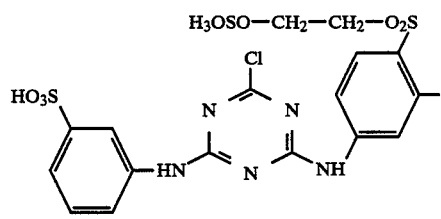
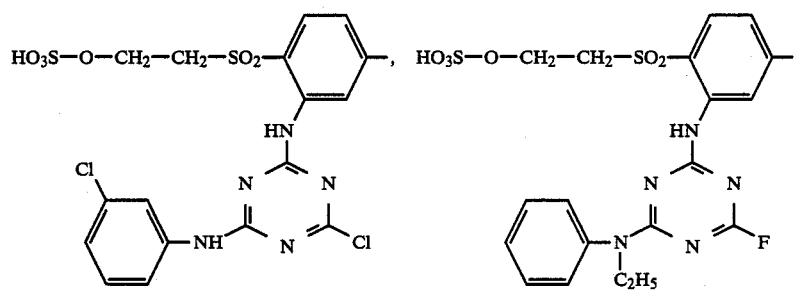
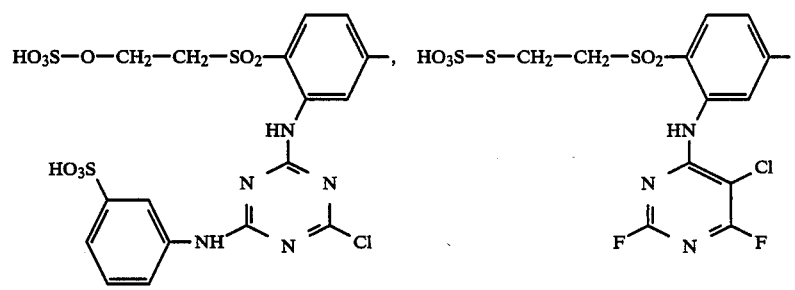
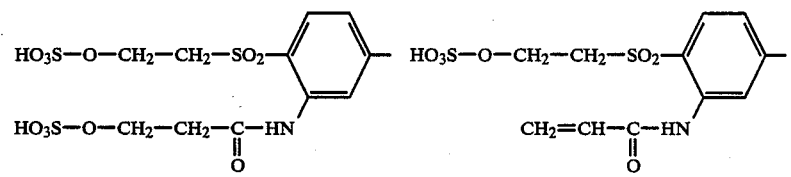

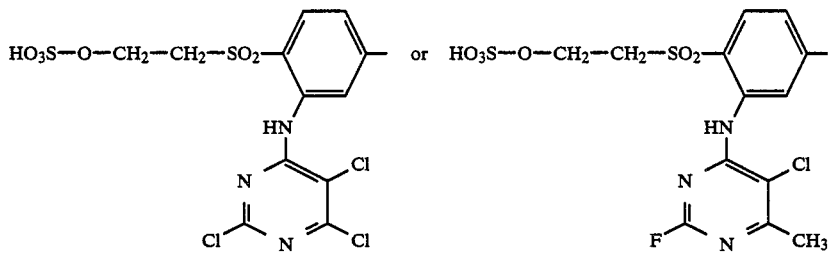

The dyes are prepared by diazotization of amines of the formula X or XI

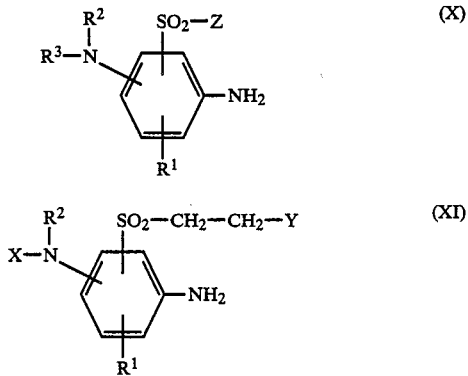

where $R^1$, $R^2$, $R^3$ and Z each have the abovementioned meaning, Y is chlorine or hydroxyl and X is an acid- or alkali-detachable protective group, such as formyl, acetyl or 3-chloropropionyl, and subsequent coupling with the aforementioned coupling components KH in a conventional manner.

In those cases where amines of the formula XI are used as starting materials, the conversion of the radical —$CH_2$—$CH_2$—Y into Z and of the radical X into $R^3$ takes place on the dye. This can be done for example by deacylation and reaction with compounds of the formula $R^3$-Hal where $R^3$ has the abovementioned meaning and Hal is halogen, in particular chlorine or bromine, and by replacement of Y, where Y is halogen, by for example thiosulfate or nicotinic acid or by esterification of the hydroxyl group, where Y is hydroxyl, with suitable esterifying agents such as phosphoric, acetic, chlorosulfonic or sulfuric acid, sulfuric acid monohydrate or low-strength oleum.

The amino compounds of the formula X or XI can be prepared for example by reacting 2-acetylamino-4-nitrochlorobenzene with 2-mercaptoethanol, oxidizing the resulting 2-acetylamino-4-nitrophenyl 2-hydroxyethyl sulfide to the sulfone and catalytically reducing the nitro group. The 2-acetylamino-4-aminophenyl 2-hydroxyethyl sulfone can either be coupled directly, in which case the replacement of the acetyl radical by a reactive group and the esterification of the hydroxyethyl sulfone takes place on the dye, or can first be converted into a compound of the formula X and then diazotized and coupled.

The reactive dyes according to the invention are suitable for dyeing or printing fiber materials, such as wool, polyamide, silk, leather or polyester fibers, but in particular cellulose-containing fiber materials, such as linen, cellulose, regenerated cellulose and especially mercerized in nonmercerized cotton. They are suitable not only for the exhaust method but also for pad dyeing whereby the fiber is impregnated with aqueous, possibly salt-containing, dye solutions or formulations (pastes) and the dyes are fixed after an alkali treatment or directly in the presence of alkali (for example sodium bicarbonate, sodium carbonate or sodium hydroxide solution) by heating.

The novel reactive dyes are suitable in particular for dyeing cotton by the exhaust method and by the cold pad-batch method, the difference between the degree of exhaustion and the degree of fixation being very small, i.e. the hydrolyzed portion being very small and the degree of fixation being remarkably high.

The reacted dyes of the formula I are further distinguished by high reactivity and good fixing properties over a wide temperature range. For instance, they require only short steam times in the pad-steam process. The dyes are readily soluble, so that unfixed dyes are readily washed off, and produce dyeings having a high fastness level.

The Examples below serve to illustrate the invention in more detail.

EXAMPLE 1

60 g of 4-(2-hydroxyethyl)sulfonyl-1,3-diaminobenzene were added at from 0° to 5° C. to 100 ml of chlorosulfonic acid in the course of 60 minutes and subsequently stirred in at from 20° to 25° C. for 16 hours. The reaction solution was then poured onto 400 g of ice, 20 g of potassium chloride were added, and the mixture was subsequently stirred at from 0° to 5° C. for one hour. Filtering with suction was followed by washing first with about 100 ml of ice-water and then with cold acetone and then by freeze-drying to give 58 g of the sulfatoester.

EXAMPLE 2

88 g of 2-(2-hydroxyethyl)sulfonyl-5-methyl-1,4-diaminobenzene were reacted with 120 ml of chlorosulfonic acid by a method similar to that of Example 1. Working-up gave 102 g of the corresponding sulfatoester.

EXAMPLE 3

95 g of 2,4-diamino-5-(2-hydroxyethylsulfonyl)benzamide were reacted by a method similar to that of Example 2 to give 108 g of the corresponding sulfatoester.

EXAMPLE 4

34 g of 2-(2-sulfatoethylsulfonyl)-5-methyl-1,4-diaminobenzene were disolved in 800 g of ice-water. 100 ml of 5N hydrochloric acid and 60 ml of 5N sodium nitrite solution were added for a diazotization at from 0° to 5° C. in the course of 30 minutes. This diazo solution was then added to a solution of 47 g of acetyl-H acid in 500 ml of water while the pH was maintained in the range from 4 to 5 with sodium acetate. Coupling overnight was followed by filtration with suction, washing with potassium chloride solution and drying to leave 70 g of salt-containing dye in No. 4.

Filtering with suction and drying left 22 g of salt-containing dye No. 5.

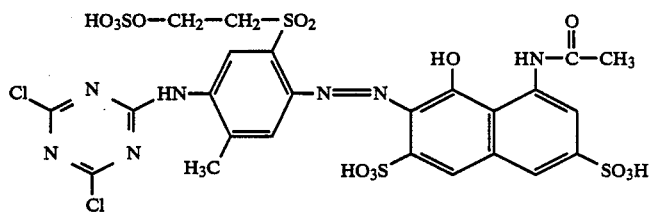

EXAMPLE 6

Example 5 was repeated to react dye No. 4 with 7 g of tetrachloropyrimidine, giving 25 g of salt-containing dye No. 6

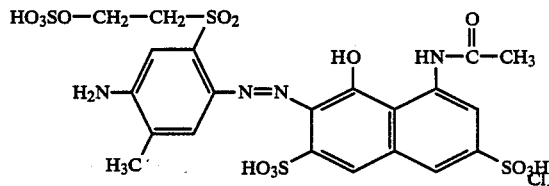

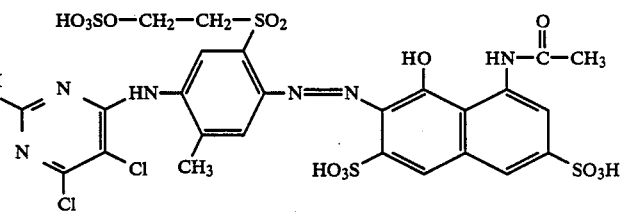

EXAMPLE 7

Example 5 was repeated to react dye No. 4 with 10 g of 2,4-difluoro-6-(N-ethyl-N-phenyl)aminotriazine, affording 28 g of the salt-containing dye of the formula

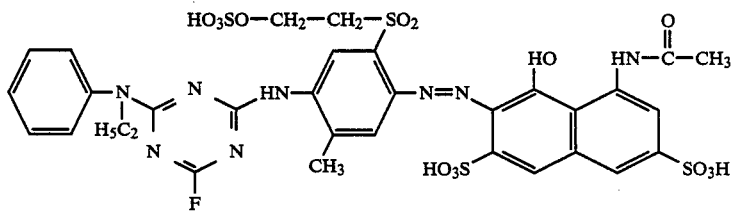

EXAMPLE 5

15 g of dye No. 4 were added to a suspension of 6 g of cyanuric chloride in 150 ml of water. Stirring was continued for 4 hours at from 35° to 40° C. and at pH 3-4, unconverted cyanuric chloride was filtered off, and 20 g of potassium chloride were added for salting out.

EXAMPLES 8-11

Example 4 is repeated using 4-(2-sulfatoethylsulfonyl)-1,3-diaminobenzene as diazo component and benzoyl-H acid as coupling component and affording, after reaction of the resulting azo compound with a halogen reactive group, the following dyes which produce bluish red dyeings.

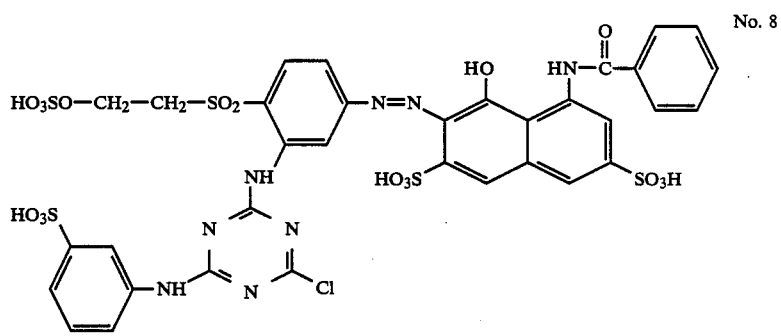

No. 8

-continued

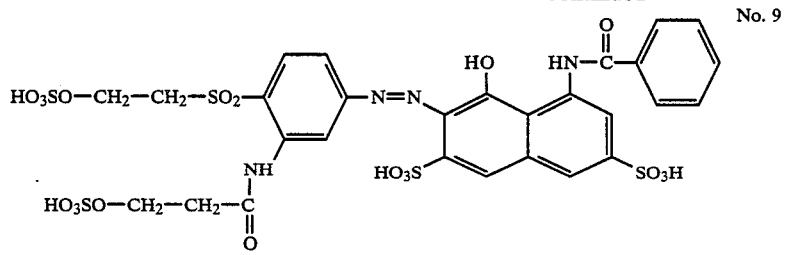
No. 9

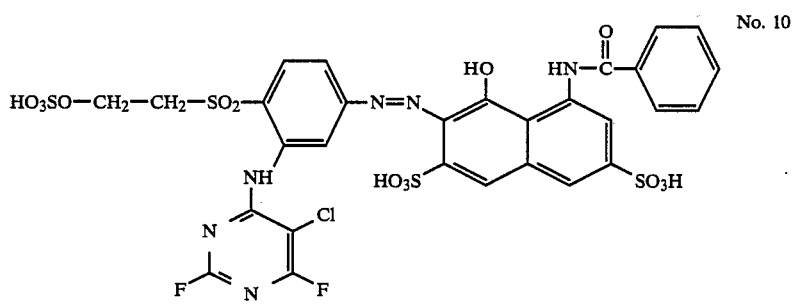
No. 10

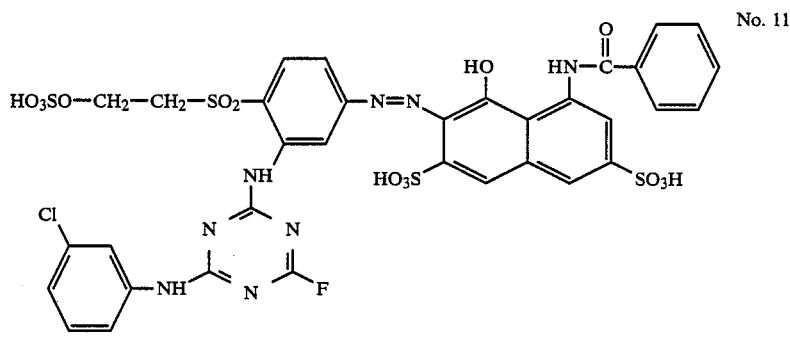
No. 11

EXAMPLE 12

54 g of 3-acetylamino-4-(2-hydroxyethylsulfonyl)aniline were diazotized at from 0° to 5° C. in 300 g of ice-water and 1000 ml of 5N hydrochloric acid with 65 ml of 5N sodium nitrite in the course of an hour. The solution of the diazonium salt was added at from 5° to 10° C. to a solution of 105 g of benzoyl-H acid in 800 ml of water while the pH was maintained in the range from 3.5 to 4.5 with sodium acetate. 6 hours of stirring at room temperature was followed by the addition of 30 g of potassium chloride, and the precipitated dye was isolated giving 208 g of salt-containing dye No. 12

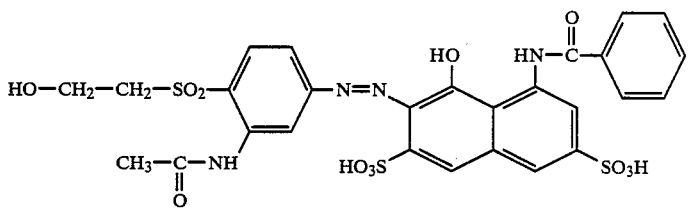

EXAMPLE 13

120 g of dye No. 12 were stirred in 200 ml of water and 200 ml of concentrated hydrochloric acid in the presence of 10 ml of phosphoric acid (85% strength by weight) at from 75° to 80° C. for 3 hours. The precipitate dye was washed with alcohol and dried. 100 g were obtained of dye No. 13

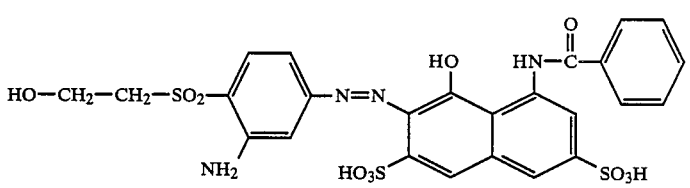

EXAMPLE 14

50 g of dye No. 13 were added to 200 g of sulfuric

EXAMPLE 16

30 g of the diazo component of the formula

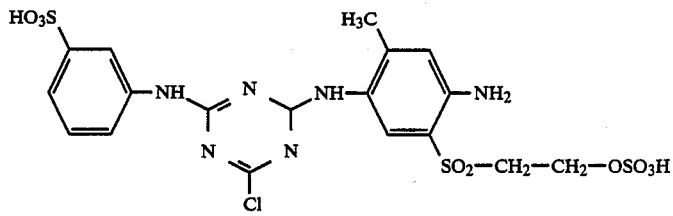

acid monohydrate at from 0° to 5° C. and stirred in at room temperature for 16 hours. The reaction solution was then added at from 0° to 10° C. to 400 ml of potassium chloride solution, and the precipitated dye was isolated. 87 g were obtained of salt-containing dye No. 14 were diazotized at from 0° to 5° C. in 230 ml of water and 40 ml of 5N hydrochloric acid with 35 ml of 3N sodium nitrite while the pH was maintained in the range from 3 to 3.5. This diazonium solution was added to a solution of 27 g of benzoyl-H acid in 200 ml of water at from 0° to 5° C. and at a pH of 3.5-4. This was followed

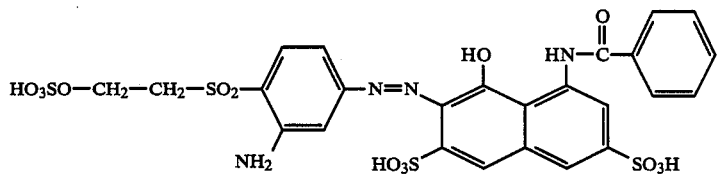

EXAMPLE 15

10 g of dye No. 14 were added to a suspension of 13 g of 2-(N-ethyl-N-phenylamino)-4,6-difluorotriazine in by 2 hours of stirring at from 20° to 25° C. and at a pH of about 4. The pH was then adjusted to 5.5, and 75 g of potassium chloride were added. 79 g were obtained of salt-containing dye No. 16

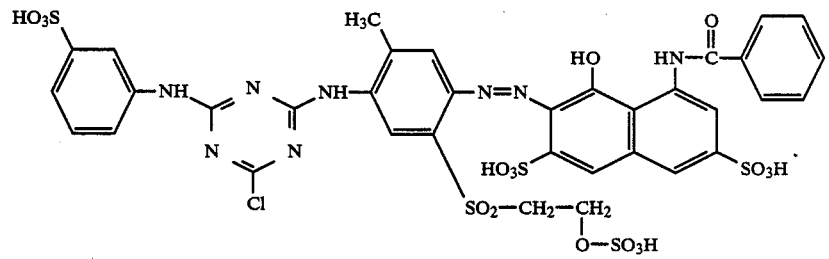

150 ml of water and stirred in for 8 hours at an increasing temperature from 0° to 35° C. and at pH 3-4.5. The addition of 15 g of potassium chloride was followed by filtration with suction. 15 g were obtained of salt-containing dye No. 15 which dyes cotton in a dull bluish red shade to a high degree of fixation.

Example 16 was repeated to prepare the following dyes which dye cotton in high degrees of fixation:

EXAMPLES 17-23

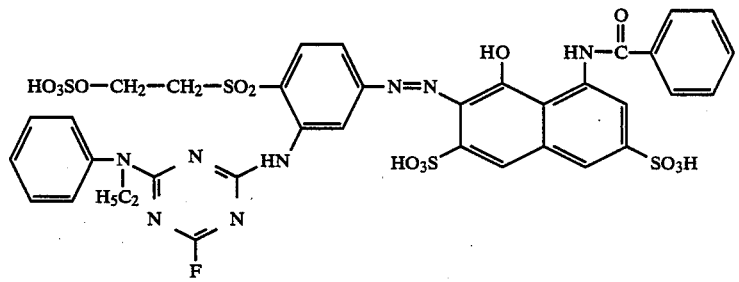

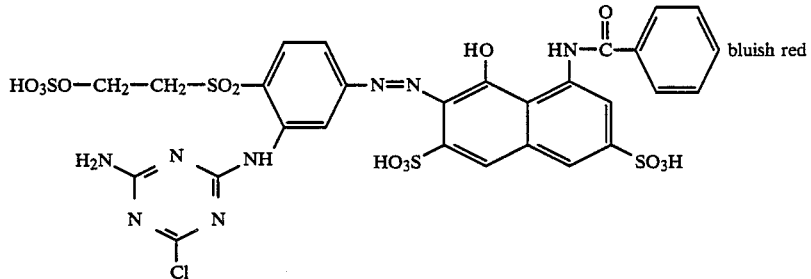 No. 17 bluish red
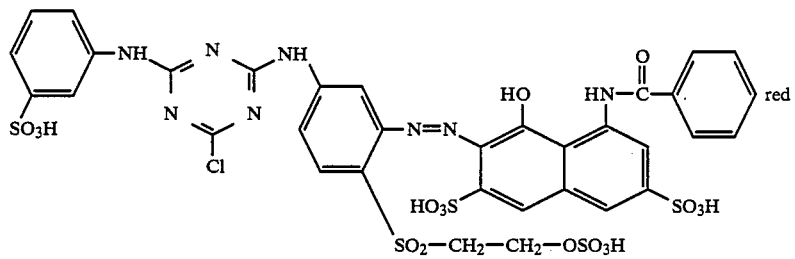 No. 18 red
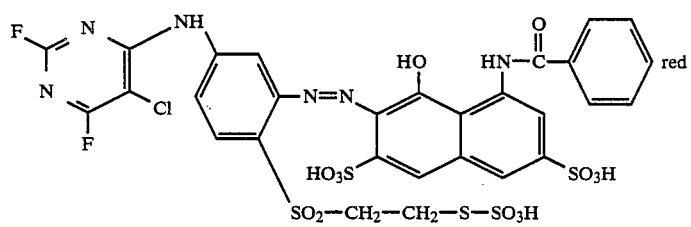 No. 19 red
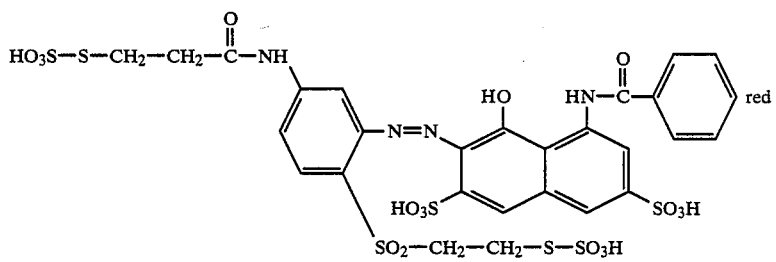 No. 20 red
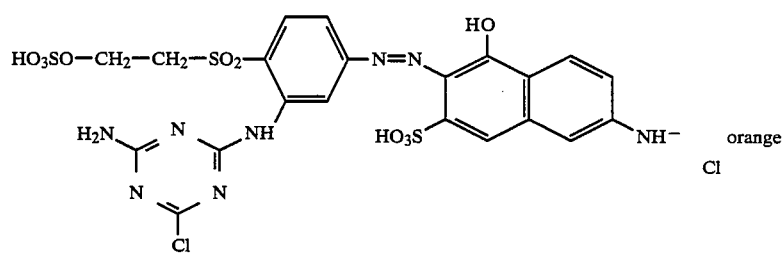 No. 21 orange
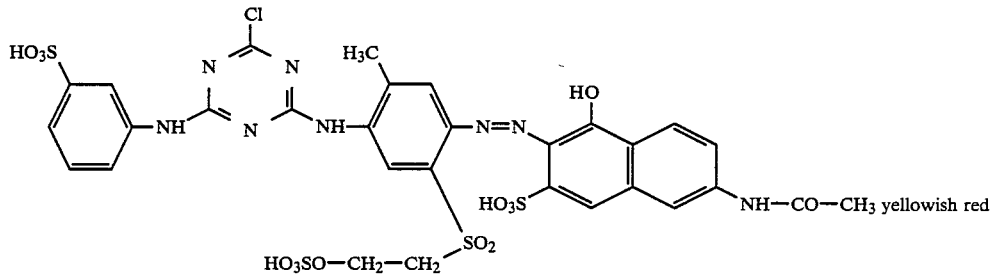 No. 22 yellowish red

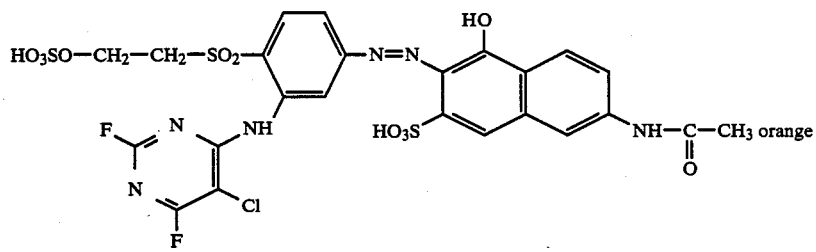
No. 23

EXAMPLE 24

90 g of the monosodium salt of the diazo component of the formula

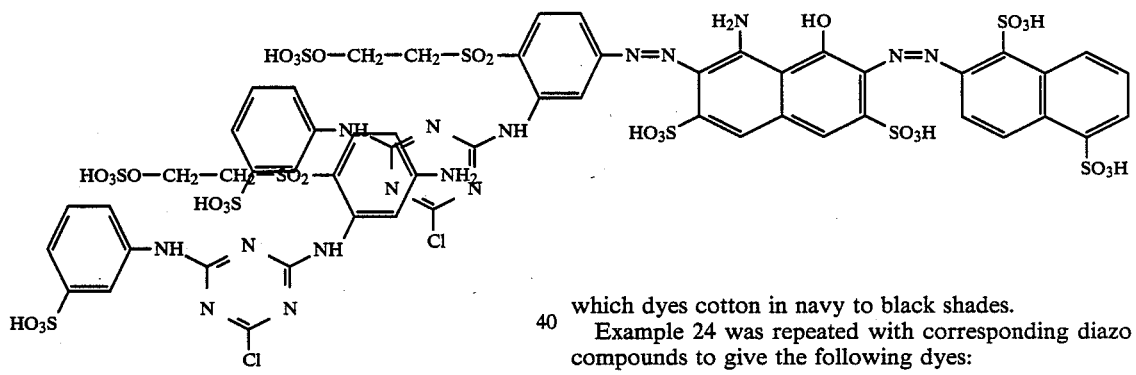

were diazotized in 400 g of ice-water and 100 ml of 5N hydrochloric acid with 71 ml of 3N sodium nitrite solution at from 0° to 5° C. After 30 minutes of stirring, excess nitrite was removed with sulfamic acid. To this suspension was added a neutral solution of 50 g of H acid in 250 ml of water in the course of 30 minutes, and the pH was then adjusted to about 2.0 with potassium bicarbonate. After about 2 hours the pH was raised from 5.5 to 6.5. At the same time 450 ml of a solution of 48 g of diazotized 2-aminonaphthalene-1,5-disulfonic acid in water were added. With the pH remaining constant, the reaction solution was clarified by filtration and spray-died. 200 g were obtained of salt-containing dye No. 24 which dyes cotton in navy to black shades.

Example 24 was repeated with corresponding diazo compounds to give the following dyes:

EXAMPLES 25-27

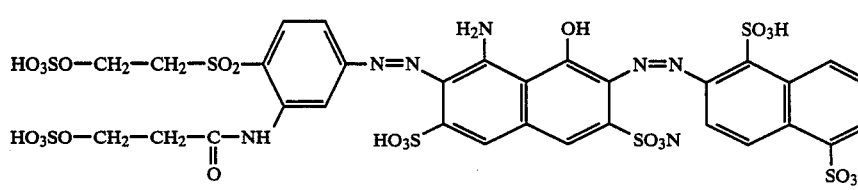
No. 25

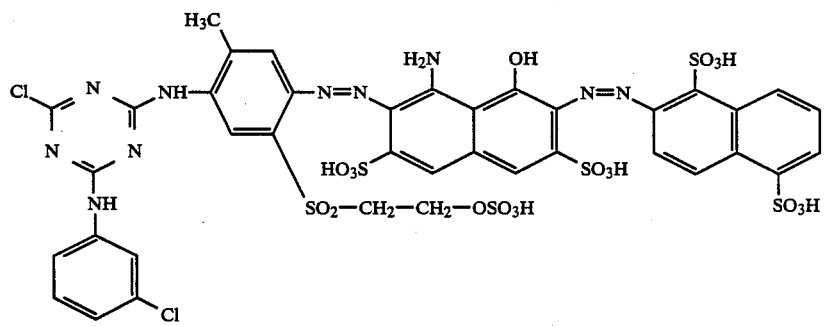
No. 26

-continued

No. 27

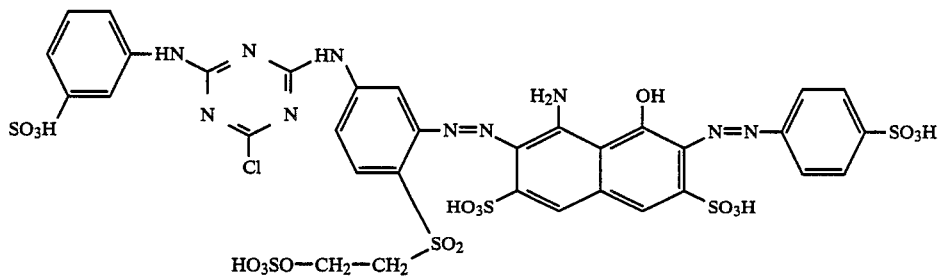

We claim:
1. An azo reactive dye of the formula

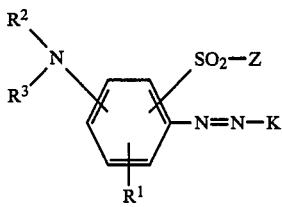

where
K is the radical of a coupling component,
$R^1$ is hydrogen, $C_1$-$C_4$-alkyl, $C_1$-$C_4$-alkoxy, halogen, carboxyl, $C_1$-$C_4$-alkoxycarbonyl, carbamoyl, $C_1$-$C_4$-mono- or dialkyl carbamoyl or hydroxysulfonyl,
Z is vinyl or the radical $CH_2$—$CH_2$—$Z^1$ where $Z^1$ is $OSO_3H$, $SSO_3H$, $OPO(OH)_2$, formyloxy, acetyloxy, the radical

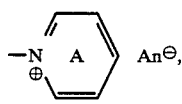

or the radical

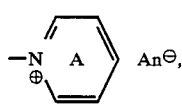

where the ring A is substituted by carboxyl or carbamoyl, and $An^\ominus$ is an anion,
$R^2$ is hydrogen, $C_1$-$C_4$-alkyl or $C_1$-$C_4$-alkyl substituted by phenyl, and
$R^3$ is unsubstituted or carboxyl-substituted $C_1$-$C_3$-alkenylcarbonyl, halogen-, $C_1$-$C_4$-alkylsulfonyl- or phenylsulfonyl-substituted $C_2$-$C_3$-alkenylcarbonyl, halogen-, $C_1$-$C_4$-alkylsulfonyl- or phenylsulfonyl-substituted propionyl, the radical CO—$CH_2$—$CH_2$—$Z^1$, where $Z^1$ has the abovementioned meaning, or a reactive group from a series of the 5- or 6-membered aromatic nitrogen heterocyclics which have one or more reactive substituents selected from halogen, ammonium, hydrazinium, pyridinium, carboxyl- or carbamoyl-substituted pyridinium, sulfonium, sulfonyl, azido, thiocyanato, thio, sulfino or sulfono, with the proviso that the radical $SO_2$—Z is not in the meta-position relative to the azo bridge.

2. An azo reactive dye as claimed in claim 1 which confirms to the formula

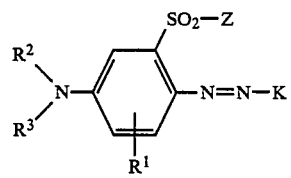

[where K, $R^1$, $R^2$, $R^3$, and Z each have the meanings mentioned in claim 1].

3. An azo reactive dye as claimed in claim 1 which confirms to the formula

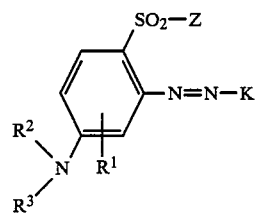

4. An azo reactive dye as claimed in claim 1 which confirms to the formula

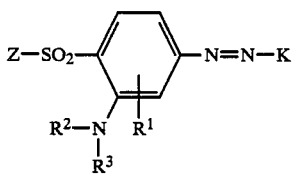

5. An azo reactive dye as claimed in claim 1, wherein $R^2$ is hydrogen or $C_1$-$C_4$-alkyl and $R^3$ is monofluorotriazinyl, monochlorotriazinyl or dichlorotriazinyl which are each substituted by phenyl, naphthyl, amino, $C_1$-$C_4$-mono-or dialkylamino, phenylamino or naphthylamino, where the phenyl, naphthyl and $C_1$-$C_4$-alkyl groups can each be substituted, and difluoropyrimidinyl, trifluoropyrimidinyl, trichloropyrimidinyl, acryloyl or 3-sulfatopropionyl.

* * * * *